Jan. 15, 1957 C. L. GRAHAM 2,777,655
AIRPLANE WITH SEPARABLE FUEL TANKS
Filed March 26, 1951 5 Sheets-Sheet 1

INVENTOR:
CONNELLY L. GRAHAM
By Herbert E. Metcalf
HIS PATENT ATTORNEY

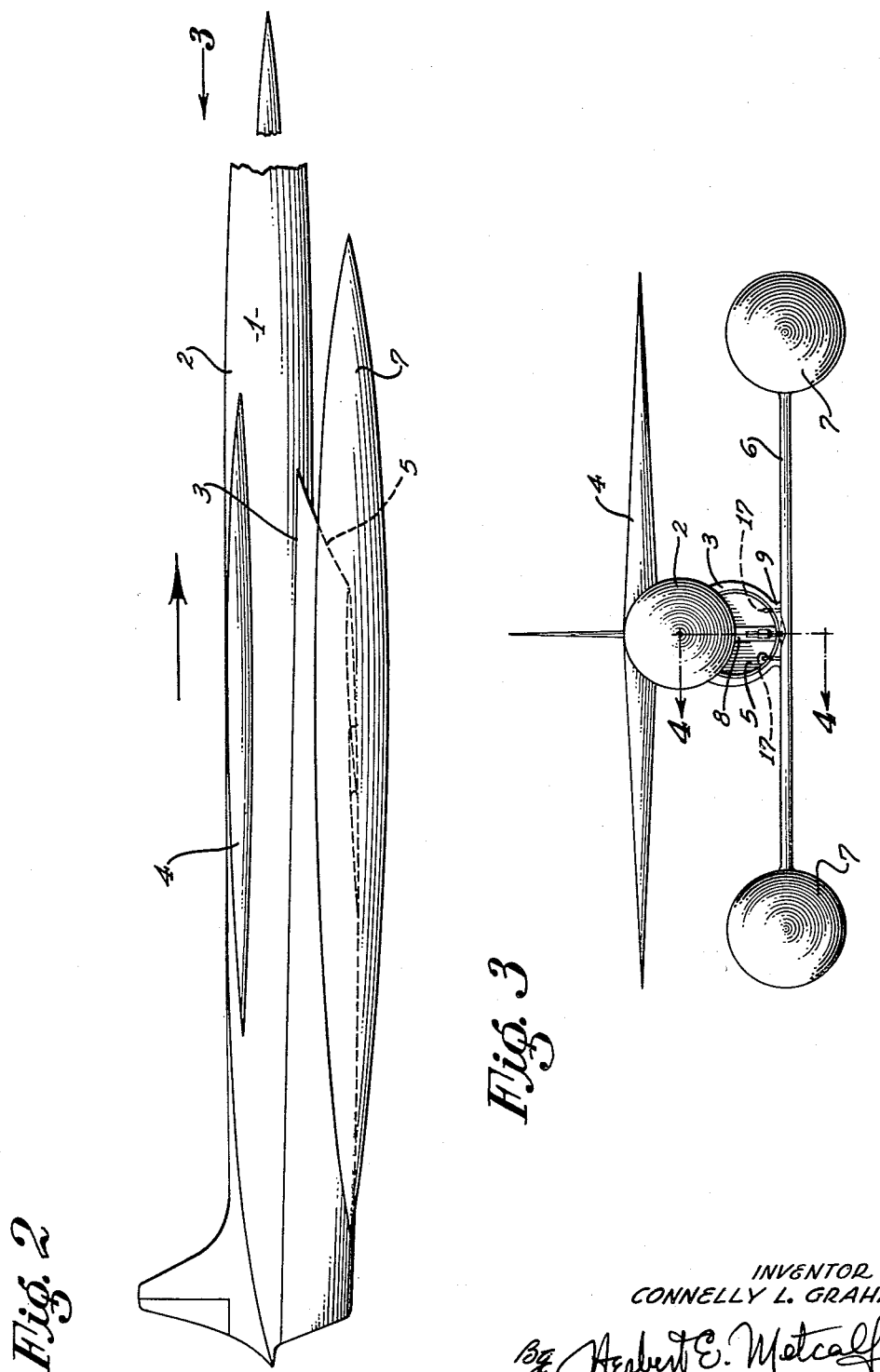

Jan. 15, 1957  C. L. GRAHAM  2,777,655
AIRPLANE WITH SEPARABLE FUEL TANKS
Filed March 26, 1951  5 Sheets-Sheet 3
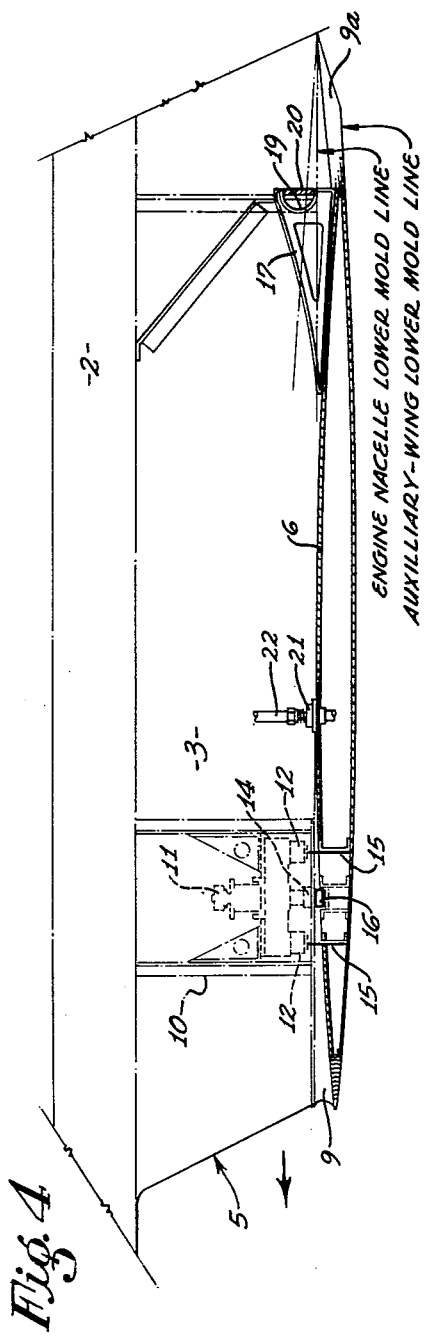
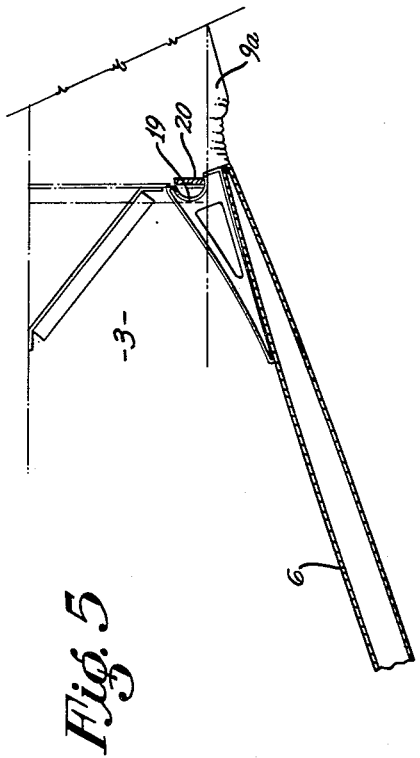
INVENTOR:
CONNELLY L. GRAHAM
By Herbert E. Metcalf
HIS PATENT ATTORNEY

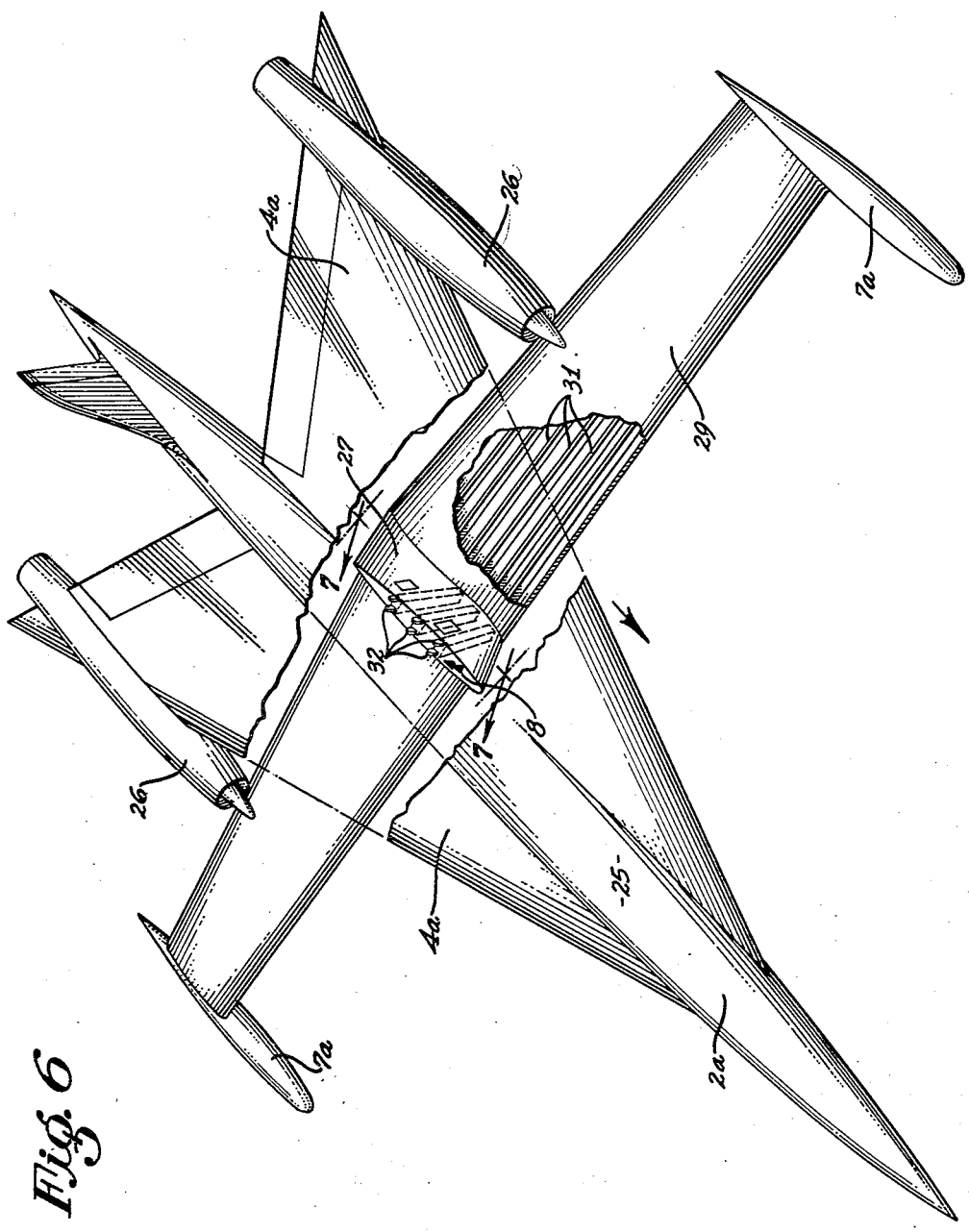

Jan. 15, 1957  C. L. GRAHAM  2,777,655
AIRPLANE WITH SEPARABLE FUEL TANKS
Filed March 26, 1951  5 Sheets-Sheet 5
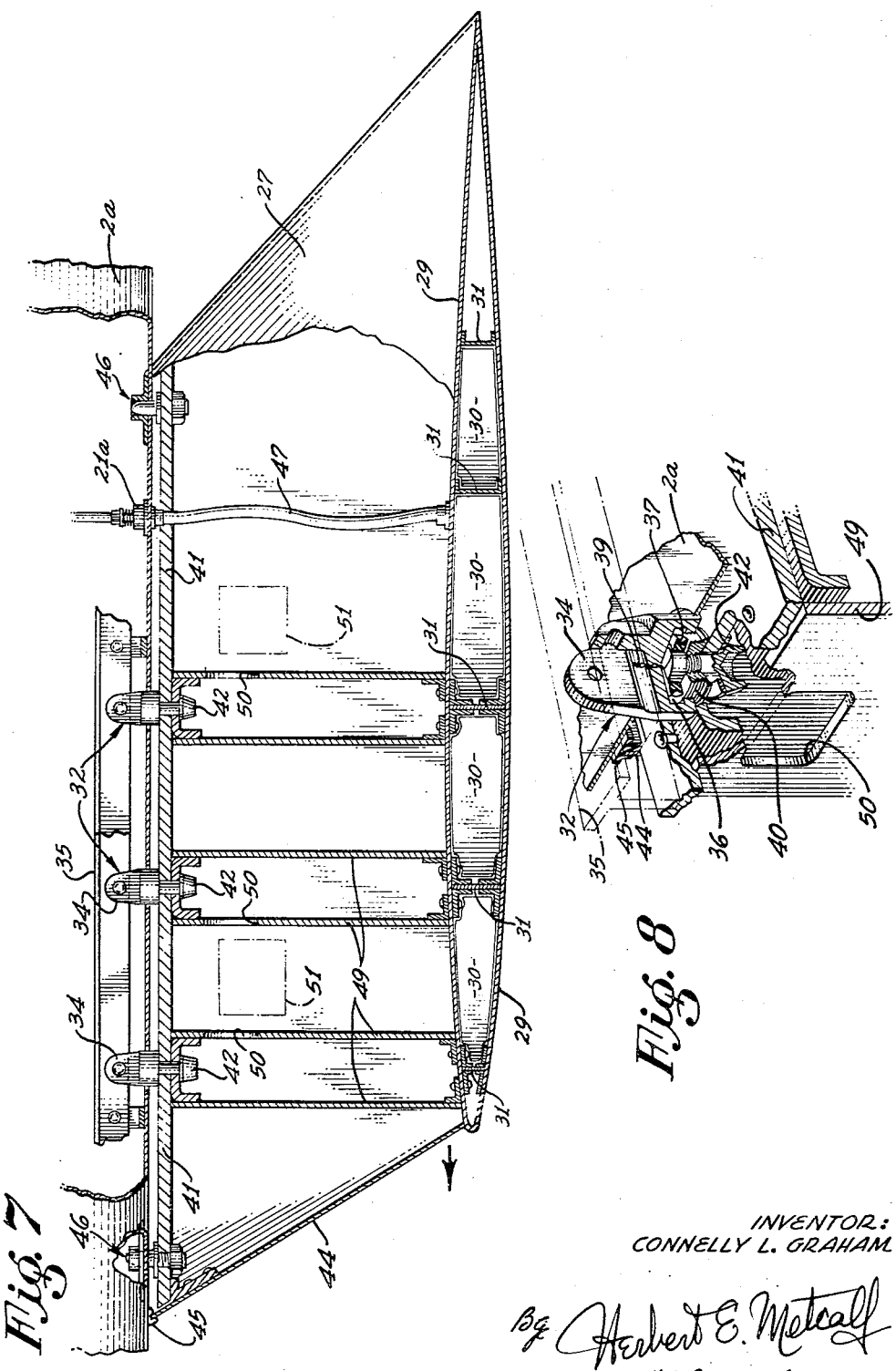
INVENTOR:
CONNELLY L. GRAHAM
By Herbert E. Metcalf
HIS PATENT ATTORNEY

United States Patent Office 2,777,655
Patented Jan. 15, 1957

2,777,655

AIRPLANE WITH SEPARABLE FUEL TANKS

Connelly L. Graham, Covina, Calif., assignor to Northrop Aircraft, Inc., Hawthorne, Calif., a corporation of California Application March 26, 1951, Serial No. 217,535

2 Claims. (Cl. 244—135)

This invention relates to airplanes, and, more particularly, to an airplane having an auxiliary separable wing which carries wing fuel tanks.

It is known, to increase the range of an aircraft, that external droppable fuel tanks may be carried, these tanks usually being of streamlined shape and carried under the wing or at the tip thereof. When these tanks have been dropped, the airplane is thus relieved of their weight and drag, and performance is then improved. At the start of the flight, however, the extra tanks and fuel constitute a load which must be lifted by the airplane.

It is an object of this invention to provide an aircraft having an extended range by means of additional fuel, and which is capable of easy take-off and flight at ordinary speeds while also retaining the advantages of greater performance and/or economy after the additional fuel tanks have been released.

In very high speed aircraft, such as those exceeding the speed of sound, the supporting airfoils are not suited for slow speed flight occurring during and immediately following the take-off or launching of the craft. If the aircraft is burdened with auxiliary external fuel tanks of the conventional type, for increased range, this slow speed phase is necessarily more difficult to accomplish and surmount. Another object of the present invention is to provide a long range, high speed aircraft having low speed flight qualities equal to a conventional lower speed aircraft.

Briefly, my invention comprises providing a separable wing on an airplane in addition to a fixed wing, the separable wing providing lift and carrying auxiliary fuel tanks, together with means for successfully releasing this wing from the airplane during flight. The auxiliary fuel tanks may be carried internally or externally of the separable wing, or both, and the external fuel tanks may be releasably attached to the separable wing if desired.

The invention may be more fully understood from the detailed description of specific apparatus to follow, together with the accompanying drawings.

In the drawings:

Figure 2 is a right side view of the airplane in Figure 1.

Figure 3 is an enlarged front view of the airplane in Figures 1 and 2.

Figure 4 is an enlarged, partial longitudinal section view of the same airplane, taken as indicated by the line 4—4 in Figure 3, showing the connections of the separable wing to the aircraft.

Figure 5 is a view similar to Figure 4, showing the rear part of the separable wing after rotation to a released position.

Figure 6 is a cut-away perspective view of another high speed aircraft, showing another embodiment of the invention where the separable wing has a vertical pedestal which is releasably attached to the airplane.

Figure 7 is an enlarged, partial longitudinal section view taken as indicated by the line 7—7 in Figure 6, showing the attachment of the pedestal to the airplane.

Figure 8 is a perspective cut-away view of one pedestal attachment point, viewed as indicated by the numeral 8 in Figure 6, showing the construction of an explosive release fitting.

Figure 1:
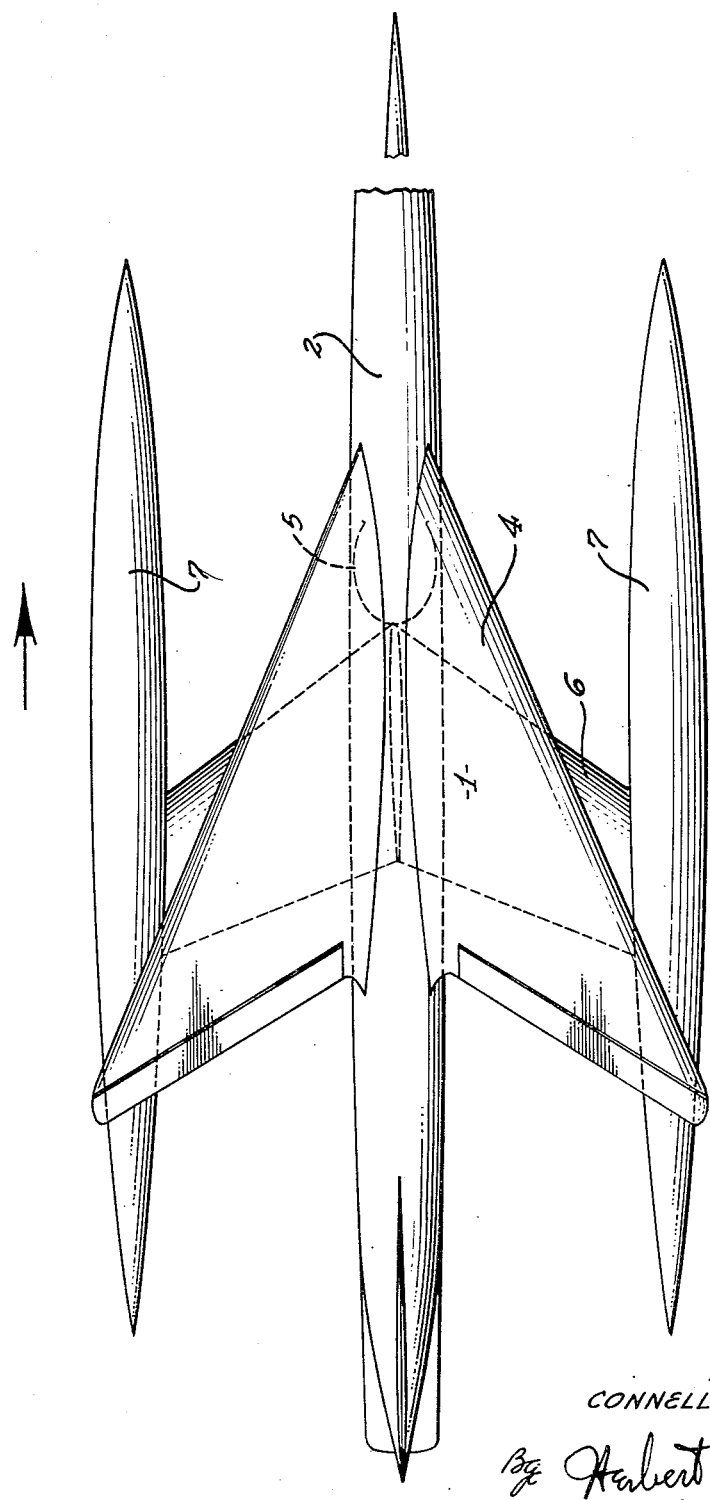
Figure 1 is a plan view of a high speed aircraft having wing tanks supported by a separable wing in one embodiment of the present invention.

Referring first to Figures 1, 2 and 3, a high speed aircraft 1 has a body 2 and an engine nacelle 3 directly beneath the body. A main wing 4 is provided intersecting the body 2 near the top thereof. At the lower side of the engine nacelle 3, just aft of an engine air inlet 5, an auxiliary wing 6 is provided. This auxiliary wing 6 carries at its tips a pair of external auxiliary wing tanks 7 carrying fuel.

In this high wing design, the auxiliary wing 6 is mounted directly to the lower side of the engine nacelle 3, with a forward fairing 9 and a rear fairing 9a installed at the juncture of the wing and nacelle to provide a smooth filleted contour. The fairings are secured to the auxiliary wing 6 and merely rest against the engine nacelle 3 without attachments, so that when the auxiliary wing and wing tanks 7 are released, the fairings also drop away from the aircraft. The forward fairing 9 is also designed to function as a sway brace.

In Figures 3 and 4 is shown the releasable attachment means for the auxiliary wing 6. A streamlined duct divider and wing support 8 passes vertically through the main duct behind the air inlet 5 and extends from the forward edge of the air inlet to a rear position ahead of the engine. Support spars 10, within the wing support 8, carry an ejector assembly 11 having two end shackles 12 with internal hooks which open when the ejector is actuated. A piston foot 14 carries a piston (not shown) which is forced downwardly just as the hooks in the shackles 12 are opened. This ejector assembly 11 may be a conventional type of bomb carrier-ejector which is operated by remotely setting off an explosive charge back of the ejector piston, and will not be described in detail.

To mate with the ejector assembly 11, the auxiliary wing 6 carries two vertical release rods 15 hooked at their upper ends to engage and hang from the ejector shackles 12. The release rods 15 are adjustably fixed to the wing structure to provide a tight connection of the auxiliary wing aginst the nacelle. A re-inforced metal pad 16 is located in the wing structure just opposite the piston foot 14 to be met by and absorb the shock of the piston when the ejector is actuated.

At the rear of the auixilary wing 6, two attachment trusses 17, one on each side of the center line, are fixed to the wing in fore-and-aft directions, the aft end of each truss being in the shape of a rearwardly pointing semicircular socket 19. Mounted transversely of the aircraft in the lower edge structure of the engine nacelle 3 is a pair of rigid braces 20 having a height equal to the diameter of the sockets 19.

When the auxiliary wing 6 is in mounted position, the braces 20 hold the wing-mounted sockets 19 against upward and downward movement. Lateral position is also determined by parts of the nacelle structure positioned closely on each side of the trusses 17, but rotational movement of the auxiliary wing about the gear braces 20 is not hindered at the aft portion of this wing. Substantially all holding of the auxiliary wing 6 in a fore-and-aft direction is accomplished by the ejector assembly 11 and release rods 15.

Fuel lines from the wing tanks 7 lead inboard to the center line of the engine nacelle and then are connected to the remainder of the aircraft fuel system by releasable fuel line fittings such as at 21 in Figure 4. The releasable fitting 21 is preferably of the common type which seals the end of the remaining fuel line 22 after being pulled apart. Fuel vent lines may be arranged for disconnection in the same manner.

It is thus seen that the jettison operation of the auxiliary wing 6 and wing tanks 7 comprises a downward kick of the leading edge of the wing by the controlled explosive in the ejector assembly 11, with the trailing edge first remaining on the nacelle by virtue of the truss engagement with the braces 20. The auxiliary wing 6 thus rotates about the rear braces at a position as shown in Figure 5. The rear fairing 9a, being of light material, merely buckles under the rotation load and then follows the auxiliary wing from the aircraft. It will be noted that the upper extreme of the socket 19 serves as a guide while sliding down the forward side of the brace 20, and thus provides a certain degree of controlled release until the wing is free, to prevent possible jamming of the rear of the auxiliary wing 6 into some part of the nacelle lower structure. The initial rotation of the wing given by the ejector action is accompanied by a strong negative wing lift, thereby insuring complete separation.

If desired, the wing tanks 7 may be releasably mounted on the tips of the auxiliary wing 6, so that the tanks may be jettisoned alone while the auxiliary wing remains with the airplane until a later time. Any suitable means may be employed for this release of the tanks from the wing.

By means of the releasable wing, the aircraft 1 is enabled to take off with a greater weight, which in this case is fuel for extended range flight, than is possible if the wing tanks were merely mounted on the main wing 4 in the absence of the auxiliary wing. Fuel from the wing tanks 7 is used first, of course. In addition, the basic aircraft configuration after the wing and tanks are dropped is aerodynamically superior to an aircraft having the necessary extra wing area to lift the same amount of auxiliary fuel built into the permanent, main wing 4.

In Figure 6 is shown another high speed airplane 25 embodying the present invention in a slightly different form. This airplane 25 has two engines 26, instead of the one in the first airplane, these two engines 26 installed in the outer panels of a low main wing 4a. In this low-wing design, where no engine nacelle is built beneath the body 2a, an auxiliary wing cannot be attached directly to the lower surface of the body.

As shown in Figures 6 and 7, a wing support pedestal 27 is releasably fastened to the lower body surface along the airplane vertical center plane. The pedestal, having an airfoil section, resembles a vertical fin, and a tank wing 29 is secured to the bottom of the pedestal 27. This tank wing 29 serves the purpose of carrying additional fuel, similar to the auxiliary wing 6 of the previous embodiment. To this end, wing tanks 7a are shown attached at the tips of the tank wing 29. The difference is that the tank wing is much larger than the auxiliary wing 6 in proportion to total airplane wing area, the tank wing area being almost equal to the main wing area in this particular embodiment. Because of its size, the tank wing 29 is provided with internal fuel cells 30 throughout a maximum of internal wing volume. Wing structure can be of any suitable type, the multiple spar construction 31 being shown herein as an example only.

The tank wing release means, best shown in Figures 7 and 8, comprises a plurality of hanger assemblies 32 arranged between the support pedestal 27 and the body 2a. Each hanger assembly 32 has a housing member 34 bolted or otherwise fixed at the top to a structural member 35 of the body 2a. A threaded opening in the bottom of the housing 34 leads to a cavity 36 wherein a shaped explosive 37 is provided. Electrical wires 39 for setting off the explosive 37 are supplied through a small hole in the upper side of the cavity 36, and the cavity is partially closed by a plug 40, threaded externally and internally.

The support pedestal 27 has a top plate 41 which contacts the plug 40 of each hanger assembly 32, and holes in the plate just under the hanger assemblies accommodate attachment bolts 42 which thread into the plugs 40 and hold the pedestal securely in place. This seals up the cavities 36, except for the small upper hole containing the wires 39, so that when the explosives 37 in all hanger assemblies 32 are simultaneously fired, the housings 34 are severed and the pedestal 27 and attached tank wing 29 are thus unsupported. The external surface skins 44 of the pedestal are continued upwardly around the edge of the top plate 41, and rubber or other sealing strips 45 are provided at the top of these surface skins 44 to fit snugly against the aircraft body 2a.

Two pin-and-socket assemblies 46 are also provided between the support pedestal 27 and the body 2a. The pins are short enough to pull out freely when the tank wing and support pedestal are released, and serve as stops to prevent twisting of the pedestal about a vertical axis, thus keeping any twisting forces from acting solely on the hanger assemblies 32. As in the previous embodiment, a releasable fuel line fitting 21a (Figure 7) is employed, to disconnect and seal the fuselage fuel line when the pedestal 27 is dropped. Connection to the fuel cells 30 through the pedestal is provided by a fuel hose 47.

As noted previously, wing tanks 7a can be installed on the tank wing 29 tips; however, they may be omitted from the airplane of Figure 6, if desired, since the internal fuel cells 30, alone, may hold a sufficient quantity. The important feature is the provision of the jettisonable wing which is used for auxiliary lift as well as fuel. Also, it will be obvious that the airplane of Figure 6 can have a main wing in any position from top to bottom of the body, by varying the vertical dimension of the support pedestal 27, and the invention is, therefore, not limited to the low-wing airplane only, as shown.

In the invention embodiment shown in Figures 6, 7 and 8, the airplane 25 is designed for supersonic speeds, and the main wing 4a is therefore a supersonic wing. The tank wing 29 is a subsonic wing and is profitably used during take-offs and subsequent flight up to near the speed of sound. By making this tank wing releasable and filling it with fuel, a two-fold purpose is realized, in order to arrive at the overall object of a high speed aircraft having the maximum possible range.

The tank wing 29 is easily installed, by hoisting into place using the pin and socket assemblies 46 for correct positioning, and then installing the attachment bolts 42. Vertical webs 49 are provided in the support pedestal 27, with permanent access holes 50 in the webs 49, and access covers 51 are installed in the surface skins 44 for use in reaching the bolts.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In a supersonic speed airplane having a main wing and a main fuel system, means for increasing the performance and range of said airplane comprising an auxiliary wing spaced below the lower side of said airplane, said auxiliary wing having a conventional aerodynamic form suitable only for subsonic speed flight, a streamlined vertical support pedestal connected to the top center of said auxiliary wing, said pedestal extending across the full root chord of said auxiliary wing, releaseable support means normally securing the top of said pedestal to the lower side of said airplane, along two spaced fore-and-aft attachment lines, and including extreme fore-and-aft positioning means between said pedestal and said airplane, said positioning means being freely separable in a relative downward direction only, fuel tanks carried by said auxiliary wing, auxiliary fuel system means connecting said fuel tanks to said main fuel system through said pedestal and including a pull-apart coupling, and jettison actuating means connected to said releasable support means adapted to quickly release said support means and jettison said auxiliary wing, pedestal and fuel tanks from said airplane.

2. In a supersonic speed airplane, the combination of a highly tapered supersonic wing fixed thereto with a leading edge sweepback of at least 45 degrees, a substantially straight, substantially constant width subsonic wing having substantially the same area as said supersonic wing, and having a conventional aerodynamic configuration suitable only for subsonic speed flight, releasable connecting means at the lower side of the fuselage of said airplane normally securing the center of said subsonic wing to said airplane under the fuselage thereof, fuel tanks carried by said subsonic wing, and power operated actuating means cooperating with said connecting means to release said connecting means and forcibly separate said subsonic wing and said fuel tanks from said airplane, whereby a maximum range, minimum take-off distance, supersonic airplane is achieved by initially using the fuel carried by said subsonic wing and then jettisoning said subsonic wing with said fuel tanks.

References Cited in the file of this patent
UNITED STATES PATENTS

| | | |
|---|---|---|
| 1,604,393 | De Muth | Oct. 26, 1926 |
| 1,672,163 | Krammer | June 5, 1928 |
| 1,719,797 | McCarthy et al. | July 2, 1929 |
| 1,742,705 | Heinrich | Jan. 7, 1930 |
| 1,833,416 | Crooke | Nov. 24, 1931 |
| 2,124,867 | Akerman | July 26, 1938 |
| 2,277,242 | Makaroff | Mar. 24, 1942 |
| 2,381,400 | Stavely | Aug. 7, 1945 |
| 2,410,239 | Roe | Oct. 29, 1946 |
| 2,475,978 | Mill | July 12, 1949 |
| 2,489,984 | Shoemaker | Nov. 29, 1949 |
| 2,537,369 | Ostroff | Jan. 9, 1951 |
| 2,556,672 | Berg et al. | June 12, 1951 |
| 2,665,862 | Grill | Jan. 12, 1954 |

FOREIGN PATENTS

| | | |
|---|---|---|
| 281,087 | Germany | Dec. 12, 1914 |
| 629,362 | France | July 25, 1927 |
| 694,019 | Germany | July 20, 1940 |
| 875,292 | France | June 15, 1942 |

OTHER REFERENCES

Jane's All the World's Aircraft, 1949–1950, page 63(c).